United States Patent
Amaya et al.

(10) Patent No.: US 9,849,513 B2
(45) Date of Patent: Dec. 26, 2017

(54) MOVING TYPE TAIL STOCK

(71) Applicant: Matsuura Machinery Corporation, Fukui, Fukui (JP)

(72) Inventors: Koichi Amaya, Fukui (JP); Kiyotaka Iwai, Fukui (JP); Syuji Iizuka, Fukui (JP)

(73) Assignee: Matsuura Machinery Corporation, Fukui (JP)

(*) Notice: Subject to any disclaimer, the term of this patent is extended or adjusted under 35 U.S.C. 154(b) by 625 days.

(21) Appl. No.: 14/571,905

(22) Filed: Dec. 16, 2014

(65) Prior Publication Data
US 2015/0328687 A1 Nov. 19, 2015

(30) Foreign Application Priority Data
May 19, 2014 (JP) .................................. 2014-103616

(51) Int. Cl.
*B23B 23/00* (2006.01)
*B23Q 15/08* (2006.01)

(52) U.S. Cl.
CPC .............. *B23B 23/00* (2013.01); *B23Q 15/08* (2013.01); *B23B 2250/16* (2013.01); *Y10T 82/2564* (2015.01)

(58) Field of Classification Search
CPC ................................ B23B 23/00; B23Q 15/08
See application file for complete search history.

(56) References Cited

U.S. PATENT DOCUMENTS

| | | | | |
|---|---|---|---|---|
| 2,027,568 A | * | 1/1936 | Whipp | B23Q 1/0027 82/117 |
| 2,733,627 A | * | 2/1956 | Layne et al. | B23B 31/404 82/169 |
| 3,160,041 A | * | 12/1964 | Hanna | B21H 3/00 82/148 |
| 2004/0029510 A1 | * | 2/2004 | Yoshimi | B24B 55/045 451/450 |
| 2006/0159800 A1 | * | 7/2006 | Yamasaki | B29C 45/661 425/593 |

FOREIGN PATENT DOCUMENTS

| | | |
|---|---|---|
| JP | 6-218630 A | 8/1994 |
| JP | Hei 10-076402 A | 3/1998 |
| JP | 2000-144256 A | 5/2000 |

* cited by examiner

*Primary Examiner* — Will Fridie, Jr.
(74) *Attorney, Agent, or Firm* — Richard M. Goldberg

(57) ABSTRACT

A tail stock moving mechanism, in which a tail stock that holds a work with a predetermined pressure force is moved by a ball screw and in which control required for holding the work with the predetermined pressure force is implemented, is accomplished in a predetermined order wherein, the tail stock 1 holds a position of the work 5 and is supported by a ball screw 2, torque generated by a drive motor 3 that drives the ball screw 2 is detected, and when the torque reaches a predetermined reference value, then operation of a brake 4 to limit rotation of the ball screw 2 and cutting off of an input from a power supply to the drive motor 3 are performed.

15 Claims, 5 Drawing Sheets

(a)

(b)

(a)

(b)

(a)

(b)

(a)

(b)

MOVING TYPE TAIL STOCK

TECHNICAL FIELD

The present invention relates to a moving mechanism for a tail stock that is moved by means of a ball screw and holds a work.

BACKGROUND OF THE INVENTION

Conventionally, hydraulic cylinders have been used to move a tail stock and apply pressure to a work, as described in Patent Document 2 for example (description on "tail stock 526" and "cylinder 527" in FIG. 1 and a paragraph [0027]). Thus, the control of the movement and pressure application has been predicated on the use of hydraulic cylinder.

However, in use of a hydraulic cylinder a large space is required to install, for example, a cylinder mechanism and an oil pressure circuit, etc.

Moreover, the hydraulic cylinder also requires complicated and cumbersome operations for the control because the pressure force applied to the work is adjusted by a manual pressure reducing valve and because the change in oil pressure is slow. Hence, the hydraulic cylinder is not suitable for speedy control.

For example, Patent Document 1 proposes a structure of sliding a tail stock with a ball screw (description on "tail stock 21" and "ball screw device" in FIG. 1 and the paragraph [0010]), to replace the method using the hydraulic cylinder having the technical problems described above. However, in Patent Document 1, a specific structure related to a control mechanism for moving the tail stock with the ball screw and applying pressure to the work, is not described at all.

PRIOR ART DOCUMENT

Patent Document

Patent Document 1: JP Hei 10-076402 A
Patent Document 2: JP 2000-144256 A

SUMMARY OF THE INVENTION

Problems to be Solved by the Invention

An object of the present invention is to provide a structure of a tail stock moving mechanism, in which a tail stock that holds a work with a predetermined pressure force is moved by means of a ball screw and in which control required for holding the work with the predetermined pressure force is implemented.

The basing structures of the present invention for achieving the object are as follows:

(1) A tail stock moving mechanism controlling a tail stock that holds a work and that is supported by a ball screw,
the controlling steps comprising:
a. detecting movement of the tail stock caused by the ball screw, and torque generated by a drive motor that drives the ball screw;
b. operating a brake to limit rotation of the ball screw, when the torque in the step a reaches a predetermined reference value; and
c. cutting off an input from a power supply to the drive motor after the brake is operated in the step b.

(2) A tail stock moving mechanism controlling a tail stock that holds a work and that is supported by a ball screw,
the controlling steps comprising:
a. detecting movement of the tail stock caused by the ball screw, and torque generated by a drive motor that drives the ball screw;
b. cutting off an input from a power supply to the drive motor, when the torque in the step a reaches a predetermined reference value; and
c. operating a brake to limit rotation of the ball screw, after the cutting off in the step b.

(3) A tail stock moving mechanism controlling a tail stock that holds a work and that is supported by a ball screw,
the controlling steps comprising:
a. detecting movement of the tail stock caused by the ball screw, and torque generated by a drive motor that drives the ball screw; and
b. operating a brake to limit rotation of the ball screw, and cutting off an input from a power supply to the drive motor at the same time, when the torque in the step a reaches a predetermined reference value.

Effect of the Invention

In the present invention with the basic structures (1), (2), (3), the ball screw may be adopted that can be operated in a space smaller than that for the hydraulic cylinder. And pressure force sufficient for holding the work is secured by appropriately selecting the torque generated by the drive motor, and operating the brake of the ball screw. Furthermore, faster control can be achieved compared with a case where the hydraulic cylinder is used.

BRIEF DESCRIPTION OF DRAWINGS

FIG. 1 is a diagram showing a state of a tail stock of Example 1, in which FIG. 1(a) is a side view along a longitudinal direction of the ball screw, and FIG. 1(b) is a side cross-sectional view taken along a direction orthogonal to the longitudinal direction.

FIG. 4 illustrates a control state in the basic structure (1), in which FIG. 4(a) shows a program corresponding to the control, and FIG. 4(b) is a graph showing how torque changes in accordance with the control by the program.

FIG. 5 illustrates a control state in the basic structure (2), in which FIG. 5(a) shows a program corresponding to the control, and FIG. 5(b) is a graph showing how torque changes in accordance with the control by the program.

FIG. 6 illustrates a control state in the basic structure (3), in which FIG. 6(a) shows a program corresponding to the control, and FIG. 6(b) is a graph showing how torque changes in accordance with the control by the program.

DETAILED DESCRIPTION

Figure 3:
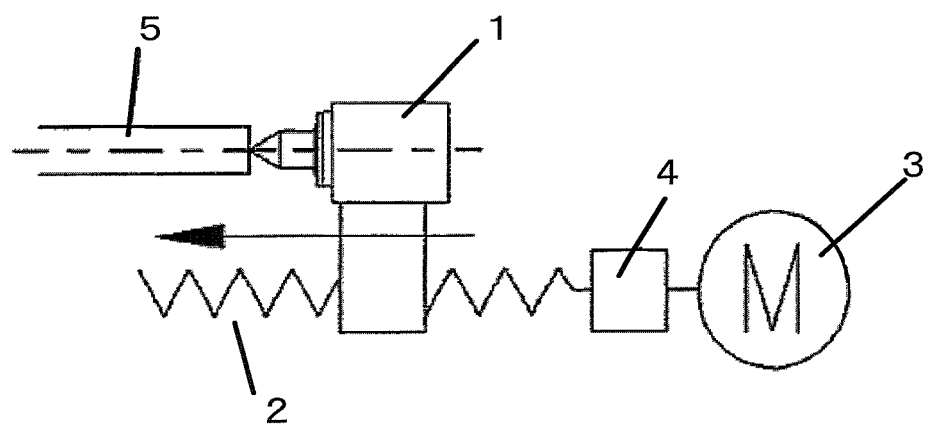
FIG. 3 shows a basic structure of each component common among the basic structures (1), (2) and (3).

As shown in FIG. 3, each of the basic structures (1), (2), (3) has a tail stock 1 which applies pressure to a work 5, a ball screw 2 which rotates to move the tail stock 1 and includes a brake 4 for ensuring the pressing state, and a drive motor 3 for the ball screw, as components.

Besides above elements, as shown in FIG. 3, the drive motor 3 is disposed on the opposite side of the work 5 with the tail stock 1 and the ball screw 2 disposed in between.

Figure 4:
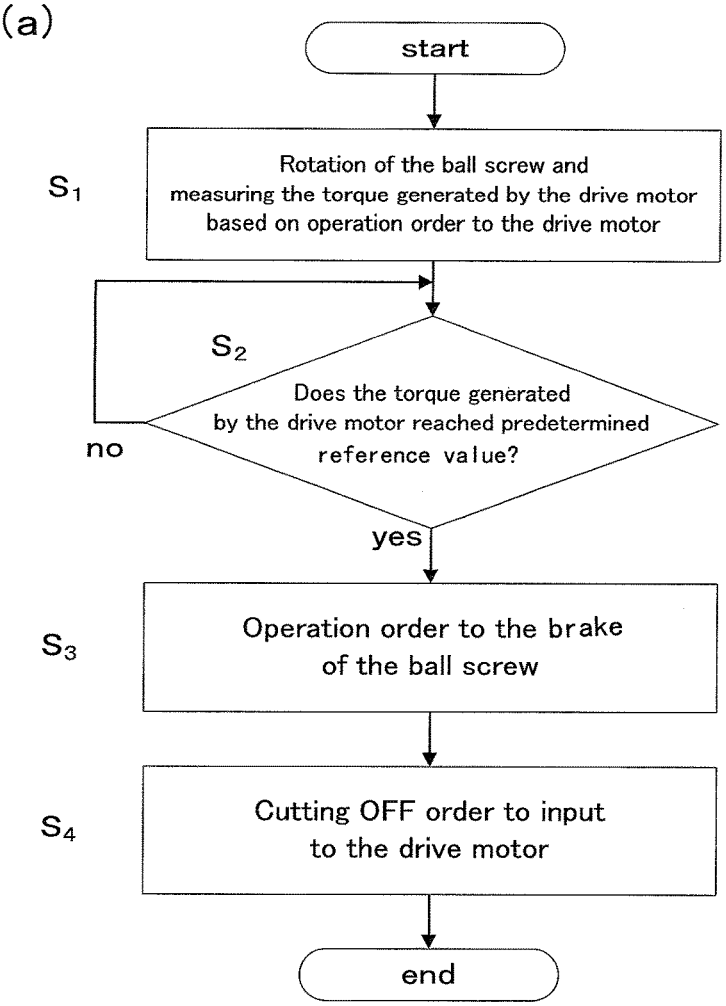
Figure 4:
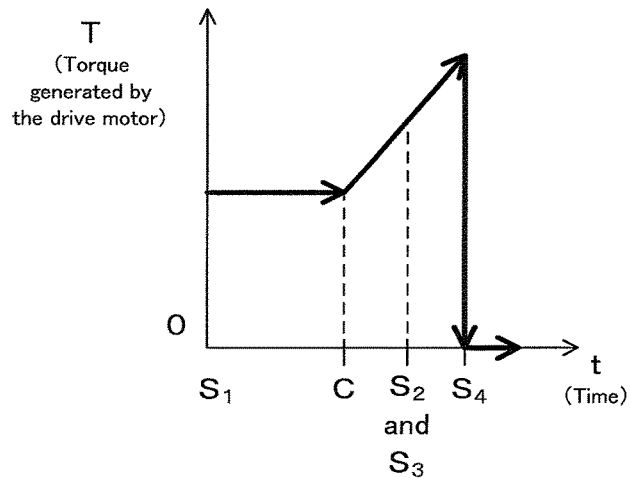

Based on the arrangement state in FIG. 3, the control by a program as shown in FIG. 4(a) is performed in the basic structure (1).

Explaining concretely, the control includes the steps of:

a. detecting movement of the tail stock 1 caused by the ball screw 2, and torque generated by a drive motor 3 that drives the ball screw (S1);

b. operating a brake 4 to limit rotation of the ball screw 2, when the torque in the step a reaches a predetermined reference value (S2 and S3); and c. cutting off an input from a power supply to the drive motor 3 after the brake 4 is operated in the step b (S4). The control on the drive motor 3 and the brake 4 of the ball screw 2 is performed through the steps described above.

FIG. 4(b) shows how the torque of the drive motor changes based on the control.

Figure 5:
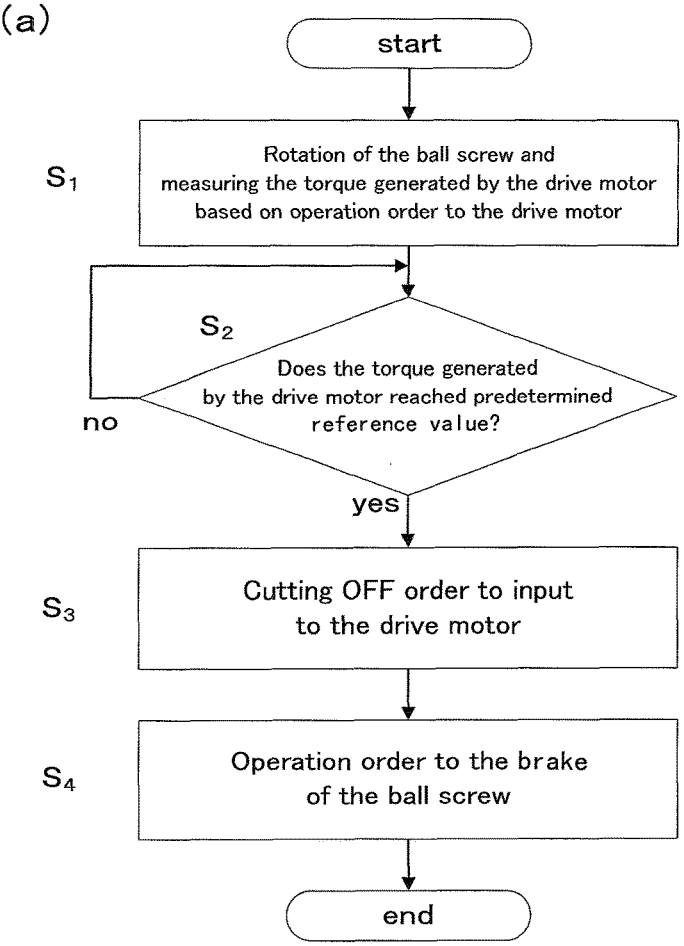
Figure 5:
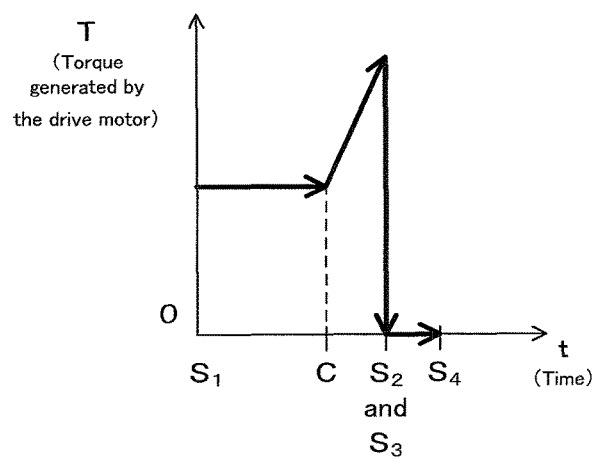

Similarly, the control of a program as shown in FIG. 5(a) is performed in the basic structure (2).

Specifically, the control includes the steps of:

a. detecting movement of the tail stock 1 caused by the ball screw 2, and torque generated by a drive motor 3 that drives the ball screw (S1);

b. cutting off an input from a power supply to the drive motor 3, when the torque in the step a reaches a predetermined reference value (S2 and S3); and c. operating a brake 4 to limit rotation of the ball screw 2, after the cutting off in the step b (S4). The control on the drive motor 3 and the brake 4 of the ball screw 2 is performed through the steps described above.

FIG. 5(b) shows how the torque of the drive motor changes based on the control.

Figure 6:
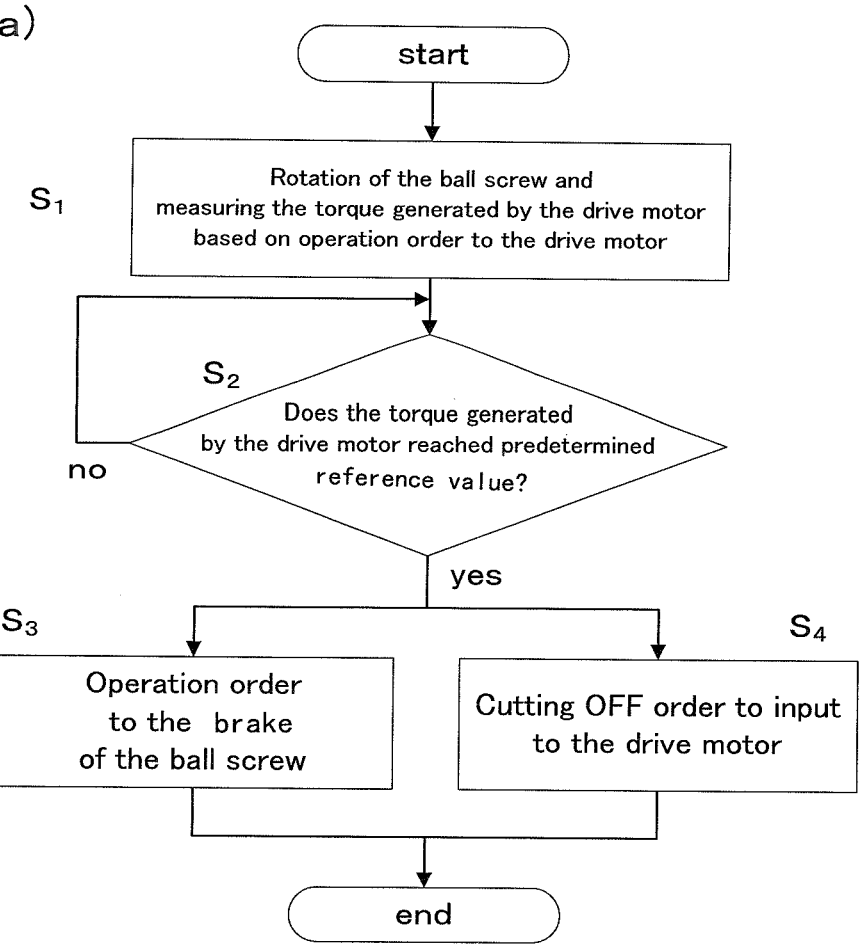
Figure 6:
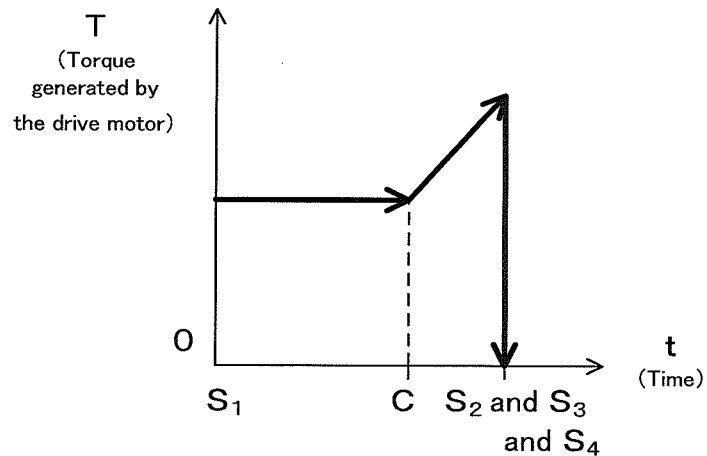

The control by a program as shown in FIG. 6(a) is performed in the basic structure (3).

Specifically, the control includes the steps of:

a. detecting movement of the tail stock 1 caused by the ball screw 2, and torque generated by a drive motor 3 that drives the ball screw (S1); and b. operating a brake 4 to limit rotation of the ball screw 2, and cutting off an input from a power supply to the drive motor 3 at the same time, when the torque in the step a reaches a predetermined reference value (S2, S3 and S4). The control on the drive motor 3 and the brake 4 of the ball screw 2 is performed through the steps described above.

FIG. 6(b) shows how the torque of the drive motor changes based on the control.

Furthermore, the following alternative embodiment can be adopted. Specifically, in the step (S1) of a in FIG. 4(a), which is common among the basic structures (1), (2), (3), whether the ball screw is at a position of the work, and where the ball screw approached to the work, may be checked, and the torque generated by the drive motor may be detected after the ball screw reaches this approach position.

Furthermore, the following alternative embodiment can be adopted. Specifically, in the step (S2) of b in FIG. 4(a), FIG. 5(a), and FIG. 6(a), which is common among the basic structures (1), (2), (3), whether the tail stock has reached a limit of movement may be determined after determining whether torque generated by the drive motor has reached the predetermined reference. Based on the determinations, the operation of the brake or the cutting off of the input from the power supply to the drive motor in the subsequent step, may be performed even when the torque has not reached the reference value, if the tail stock has reached the limit of movement.

When the tail stock is moved by the rotation of the ball screw to come into contact with the work, the pressure to the work and the reaction from the work against the pressure are generated. Thus, the drive motor has to generate torque that is balanced with the reaction.

As a result, the torque sharply rises as shown in a position of the time C in FIG. 4(b), FIG. 5(b), and FIG. 6(b). Thus, also the input current to the drive motor and the power consumption in the drive motor sharply increase (Note that C represents the term of "Contact").

In the basic structure (1), the brake is operated to limit rotation of the ball screw when the torque generated by the drive motor reaches the predetermined reference value; and the input from the power supply to the drive motor is cut off after the brake is operated. Thus, to prevent an excessive increase in the input current and the power consumption resulting from the sharp rise of the torque, the abovementioned reference value may be set to prevent the excessive increase at the time of cutting off the power supply.

In the basic structure (2), the input from the power supply to the drive motor is cut off when the torque generated by the drive motor reaches the predetermined reference value, and then the brake is operated to limit rotation of the ball screw. Thus, there may be a risk that the torque disappears before the brake is operated, and thus the tail stock is pushed back by the reaction from the work.

In view of such a risk, a design may be applied in which the inclination angle of the screw of the ball screw is set to be small so that the reverse rotation of the ball screw does not occur.

In the basic structure (3), the operation of the brake to limit rotation of the ball screw and the cutting off of the input from the power supply to the drive motor are performed at the same time when the torque generated by the drive motor reaches the predetermined reference value. Thus, the technical problems in the basic structures (1) and (2) do not arise.

In any of the basic structures (1), (2), (3), the brake is operated when the torque generated by the drive motor reaches the predetermined reference value. Thus, the tail stock supported by the ball screw can hold the work with the pressure force corresponding to the torque.

The torque generated by the drive motor corresponds to the pressure force produced by the movement of the ball screw. Thus, it may not be impossible to implement a mechanical measurement method by setting a distortion meter at a position on a rear end of the work, and measuring the torque based on the level of the distortion.

However, such a mechanical measurement method may not even be accurate, and moreover requires extra facilities.

In view of such a situation, the torque in the drive motor is generally measured based on the input current to the drive motor or the power consumption in the drive motor that is in correspondence with the torque.

Technically, current based on counter electromotive force or power consumption based on counter electromotive force in the drive motor more directly reflects the torque. Still, the input current or the power consumption can be more easily measured than the generation current or electric power.

Examples are described as follows.

EXAMPLES

Example 1

Figure 1:
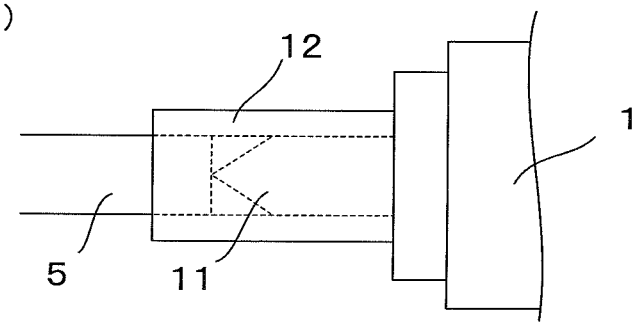
Figure 1:
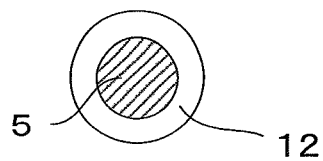

As is shown in FIG. 1, example 1 has the following features:

a pipe 12 that fits in close contact to a rear end of the work 5 and an outer circumference surface around the rear end protrudes from a periphery of a protruding part 11 that applies pressure to a rear end surface of the work 5, and the pipe 12 fits in close contact to a circumference of the protruding part 11.

In example 1, the pipe 12 holds the work 5 while being in contact with and fitted on the work. Thus, the tail stock 1 can also be applied as a vibration stopper effect.

Note that the pipe 12 is prepared separately from the tail stock 1 and uniquely in accordance with the diameter of the work. The pipe contacts and fits on the rear end and a circumference surface of the read end of the work 5, and the circumference of the protruding part 11 of the tail stock 1, so that sufficient vibration stopper function can be exerted.

Example 2

Figure 2:
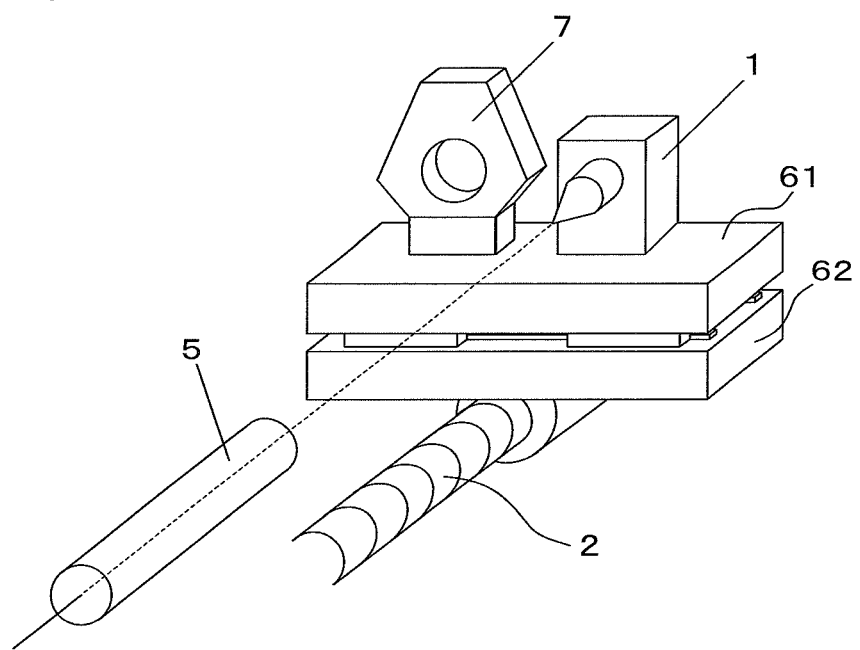
FIG. 2 is a perspective view showing an arranged state of the tail stock and a vibration stopper device in a second embodiment.

As shown in FIG. 2, example 2 has the following features:
a pair of upper and lower base plates 61, 62 is disposed on the ball screw 2, the tail stock 1 and a vibration stopper 7 are arranged side-by-side on upper base plate 61 in a direction orthogonal to the longitudinal direction of the ball screw 2, and the upper base plate 61 is movable relative to a lower base plate 62 in a direction orthogonal to the longitudinal direction of the ball screw 2 or is fixed to the lower base plate 62 in a direction orthogonal to the longitudinal direction of the ball screw 2.

In example 2, with the common ball screw, the work can be applied with pressure by the tail stock and furthermore, after a process step for the work has started, the vibration of the work is prevented with fitting the vibration stopper.

APPLICABILITY OF THE INVENTION

The present invention can hold almost any work with required pressure force, and thus is extremely useful.

EXPLANATION OF REFERENCE NUMERALS 1 tail stock
11 protruding part of tail stock
12 pipe
2 ball screw
3 drive motor
4 brake
5 work
61 upper base plate
62 lower base plate
7 vibration stopper

What is claimed is:

1. A tail stock moving method for controlling a tail stock that holds a work and is supported by a ball screw, the method comprising the steps of:
    a. detecting movement of the tail stock caused by the ball screw, and torque generated by a drive motor that drives the ball screw;
    b. operating a brake to limit rotation of the ball screw, when the torque in the step a reaches a predetermined reference value; and
    c. cutting off an input from a power supply to the drive motor after the brake is operated in the step b.

2. A tail stock moving method for controlling a tail stock that holds a work and is supported by a ball screw, the method comprising the steps of:
    a. detecting movement of the tail stock caused by the ball screw, and torque generated by a drive motor that drives the ball screw;
    b. cutting off an input from a power supply to the drive motor, when the torque in the step a reaches a predetermined reference value; and
    c. operating a brake to limit rotation of the ball screw, after the cutting off in the step b.

3. A tail stock moving method for controlling a tail stock that holds a work and is supported by a ball screw, the method comprising the steps of:
    a. detecting movement of the tail stock caused by the ball screw, and torque generated by a drive motor that drives the ball screw; and
    b. operating a brake to limit rotation of the ball screw, and cutting off an input from a power supply to the drive motor at the same time, when the torque in the step a reaches a predetermined reference value.

4. The tail stock moving method according to claim 1, wherein the step of detecting the torque generated by the drive motor is based on input current to the drive motor.

5. The tail stock moving method according to claim 1, wherein the step of detecting the torque generated by the drive motor is based on power consumption in the drive motor.

6. The tail stock moving method according to claim 1, wherein:
    a pipe fits in close contact to a rear end of the work,
    an outer circumference surface of the pipe around the rear end protrudes from the pipe,
    a protruding part of the tail stock applies pressure to a rear end surface of the work, and
    the pipe fits in close contact to a circumference of the protruding part.

7. The tail stock moving method according to claim 1, wherein:
    a pair of upper and lower base plates is disposed on the ball screw,
    the tail stock and a vibration stopper are arranged side-by-side on the upper base plate in a direction orthogonal to a longitudinal direction of the ball screw, and
    the upper base plate is one of:
        movable relative to a lower base plate in a direction orthogonal to the longitudinal direction of the ball screw and
        is fixed to the lower base plate in a direction orthogonal to the longitudinal direction of the ball screw.

8. The tail stock moving method according to claim 2, wherein the step of detecting the torque generated by the drive motor is based on input current to the drive motor.

9. The tail stock moving method according to claim 2, wherein the step of detecting the torque generated by the drive motor is based on power consumption in the drive motor.

10. The tail stock moving method according to claim 2, wherein:
    a pipe fits in close contact to a rear end of the work,
    an outer circumference surface of the pipe around the rear end protrudes from the pipe,
    a protruding part of the tail stock applies pressure to a rear end surface of the work, and
    the pipe fits in close contact to a circumference of the protruding part.

11. The tail stock moving method according to claim 2, wherein:
    a pair of upper and lower base plates is disposed on the ball screw,
    the tail stock and a vibration stopper are arranged side-by-side on the upper base plate in a direction orthogonal to a longitudinal direction of the ball screw, and the upper base plate is one of:
> movable relative to a lower base plate in a direction orthogonal to the longitudinal direction of the ball screw and
>
> is fixed to the lower base plate in a direction orthogonal to the longitudinal direction of the ball screw.

12. The tail stock moving method according to claim 3, wherein the step of detecting the torque generated by the drive motor is based on input current to the drive motor.

13. The tail stock moving method according to claim 3, wherein the step of detecting the torque generated by the drive motor is based on power consumption in the drive motor.

14. The tail stock moving method according to claim 3, wherein:
> a pipe fits in close contact to a rear end of the work,
> an outer circumference surface of the pipe around the rear end protrudes from the pipe,
> a protruding part of the tail stock applies pressure to a rear end surface of the work, and
> the pipe fits in close contact to a circumference of the protruding part.

15. The tail stock moving method according to claim 3, wherein:
> a pair of upper and lower base plates is disposed on the ball screw,
> the tail stock and a vibration stopper are arranged side-by-side on the upper base plate in a direction orthogonal to a longitudinal direction of the ball screw, and
> the upper base plate is one of:
> > movable relative to a lower base plate in a direction orthogonal to the longitudinal direction of the ball screw and
> >
> > is fixed to the lower base plate in a direction orthogonal to the longitudinal direction of the ball screw.

* * * * *